(12) United States Patent
Brizzolara et al.

(10) Patent No.: US 10,125,208 B2
(45) Date of Patent: *Nov. 13, 2018

(54) TRANSPARENT ARTICLE MADE OF PVC GRAFT COPOLYMERS

(71) Applicant: VESTOLIT GmbH & Co. KG, Marl (DE)

(72) Inventors: Davide Brizzolara, Herten (DE); Ingo Fischer, Marl (DE); Jan-Stephan Gehrke, Haltern am See (DE); Dieter Polte, Schermbeck (DE); Axel Stieneker, Münster (DE); Harald Sturm, Dorsten (DE)

(73) Assignee: VESTOLIT GmbH & Co. KG, Marl (DE)

(*) Notice: Subject to any disclaimer, the term of this patent is extended or adjusted under 35 U.S.C. 154(b) by 363 days.

This patent is subject to a terminal disclaimer.

(21) Appl. No.: 14/767,260

(22) PCT Filed: Feb. 11, 2013

(86) PCT No.: PCT/EP2013/052655
§ 371 (c)(1),
(2) Date: Nov. 30, 2015

(87) PCT Pub. No.: WO2014/121850
PCT Pub. Date: Aug. 14, 2014

(65) Prior Publication Data
US 2016/0075812 A1    Mar. 17, 2016

(51) Int. Cl.
| C08F 265/04 | (2006.01) |
| C08L 51/00 | (2006.01) |
| C08J 3/00 | (2006.01) |

(52) U.S. Cl.
CPC ............ *C08F 265/04* (2013.01); *C08J 3/005* (2013.01); *C08L 51/003* (2013.01); *C08J 2351/00* (2013.01); *C08J 2451/00* (2013.01); *C08L 2201/10* (2013.01); *C08L 2203/16* (2013.01); *C08L 2205/025* (2013.01)

(58) Field of Classification Search
CPC ............ C08J 2351/00; C08L 2205/025; C08L 2207/53; C08F 214/06
See application file for complete search history.

(56) References Cited

U.S. PATENT DOCUMENTS

| 5,614,049 | A | 3/1997 | Kohlhammer et al. |
| 6,583,221 | B1 | 6/2003 | Omura et al. |
| 2002/0142158 | A1* | 10/2002 | Ono .................... C09J 4/00 428/343 |
| 2005/0113540 | A1* | 5/2005 | Weaver ............... C08F 210/02 526/308 |
| 2007/0149713 | A1 | 6/2007 | Kuwahata et al. |
| 2016/0075811 | A1 | 3/2016 | Brizzolara et al. |
| 2016/0075870 | A1 | 3/2016 | Brizzolara et al. |

FOREIGN PATENT DOCUMENTS

| CA | 2900843 A1 | 8/2014 | |
| CA | 2907442 A1 | 8/2014 | |
| CA | 2907479 A1 | 8/2014 | |
| CN | 105229037 A | 1/2016 | |
| CN | 105246921 A | 1/2016 | |
| CN | 105246969 A | 1/2016 | |
| DE | 2123384 A1 | 11/1972 | |
| DE | 3544235 A1 * | 6/1987 | ............ C08L 27/06 |
| DE | 3803036 A1 | 8/1989 | |
| DE | 4338374 A1 | 5/1995 | |
| DE | 10121580 * | 11/2002 | |
| DE | 10121580 A1 | 11/2002 | |
| EP | 0313507 A2 | 4/1989 | |
| EP | 0472852 B1 | 3/1992 | |
| EP | 0590659 A1 | 4/1994 | |
| EP | 0647663 B1 | 4/1995 | |
| EP | 2067795 A1 | 6/2009 | |
| EP | 2953980 A1 | 12/2015 | |
| EP | 2953981 A1 | 12/2015 | |
| EP | 2954007 A1 | 12/2015 | |
| GB | 1530854 A | 11/1978 | |
| JP | 2003253082 A | 9/2003 | |
| JP | 2016507621 A | 3/2016 | |
| JP | 2016510074 A | 4/2016 | |
| RU | 2021292 C1 | 10/1994 | |
| RU | 2274647 C2 | 4/2006 | |
| SU | 481160 A3 | 8/1975 | |
| WO | 2014121850 A1 | 8/2014 | |
| WO | 2014121851 A1 | 8/2014 | |
| WO | 2014121852 A1 | 8/2014 | |

OTHER PUBLICATIONS

Domininghaus-Kunststoffe, 7th revised and extended edition, 2008, chapter 2.1.2.2.1 Erhohung der Schlagzahigkeit, Polyacrylate als Modifizierungsmittel fur transparente PVC-Artikel, p. 372 (with English translation of p. 372).
F.P. Reding et al., Glass transition and melting point of poly(vinyl chloride), Journal of Polymer Science, Vo.. 56, No. 163, Jan. 1, 1962, pp. 225-231.
International Preliminary Report on Patentability issued in PCT/EP2013/052655, completed Jul. 2, 2015, 23 pages.
International Preliminary Report on Patentability issued in PCT/EP2013/052656, completed on Jul. 20, 2015, 14 pages.
International Preliminary Report on Patentability issued in PCT/EP2013/052657, completed on Apr. 20, 2015, 10 pages.
International Search Report issued in PCT/EP2013/052655, dated Oct. 18, 2013, 5 pages.
International Search Report issued in PCT/EP2013/052656, dated Oct. 18, 2013, 4 pages.
International Search Report issued in PCT/EP2013/052657, dated Oct. 25, 2013, 4 pages.

(Continued)

*Primary Examiner* — Mark S Kaucher
(74) *Attorney, Agent, or Firm* — Faegre Baker Daniels LLP

(57) ABSTRACT

The invention relates to a method for preparing vinyl chloride graft copolymers by emulsion polymerization and to a method for preparing blends of such graft copolymers. The invention also relates to transparent molded articles prepared by using the graft copolymers according to the invention and their blends, respectively.

12 Claims, No Drawings

(56) References Cited

OTHER PUBLICATIONS

Wilkes et al., PVC-Handbook, 1st Edition, Chapter 1, p. 14, Hanser Gardner Publications (2005).
Pan, Mingwang, et al. "Synthesis and Characterization of Poly(butyl acrylate-co-ethylhexyl acrylate)/Poly(vinyl chloride)[P(BA-EHA)/PVC] Novel Core-Shell Modifier and Its Impact Modification for a Poly(vinyl chloride)-Based Blend." Polymer Engineering and Science, 50(6):1085-1094, 2010.

* cited by examiner

TRANSPARENT ARTICLE MADE OF PVC GRAFT COPOLYMERS

The invention relates to a method for preparing vinyl chloride graft copolymers by emulsion polymerization and to a method for preparing blends of such graft copolymers. The invention also relates to transparent molded articles manufactured by using the graft copolymers according to the invention and their blends, respectively.

Plasticized polyvinyl chloride (PVC) does not belong to the group of the thermoplastic elastomers (TPE), although it has TPE properties (PVC-Handbook, Charles E. Wilkes, James W. Summers, Charles Anthony Daniels—2005, page 14). Due to the low costs for the raw materials, the multi-faceted processing properties and the good product features it takes a special position among the thermoplastic elastomers. Plasticized PVC shows very good stretchability and tensile strength due to the formation of microcrystallites and the dipole-dipole interactions between chlorine and hydrogen atoms. By varying the percentage of plasticizer in PVC, the rigidity and flexibility of a product can be adjusted in a very easy manner. This has major logistic advantages for the fabricator, since he can produce a plurality of products from only a few ingredients. Only the migration ability of the low-molecular weight plasticizer has to be considered a disadvantage. Due to migration of the plasticizer the material embrittles, which leads to a degradation of the mechanical properties.

For many years, various oligomeric and polymeric plasticizers have been employed, which, due to their high molecular weights, show only little to none tendency to migrate (Domininghaus-Kunststoffe, $7^{th}$ revised and extended edition 2008). Known examples are copolymers consisting of ethylene-vinyl acetate-vinyl chloride (EVA-VC), ethylene-vinyl acetate (EVA, Levapren®), acrylonitrile-butadiene (NBR), styrene-butadiene (SBR), ethylene-vinyl acetate-carbon monoxide (Elvaloy®), styrene-butadiene-styrene (SBS, Kraton®), etc. The high-molecular weight plasticizers are blended with PVC or grafted with PVC in a suspension polymerization process. These products are only used for special requirements (low-temperature flexibility, low migration, fat resistance, etc.), since otherwise the disadvantages will prevail, such as low plasticizing, more complex processing, inferior tear resistance, etc. To be considered a particularly serious drawback is the fact that molded articles, which were produced from a blend of PVC and the majority of polymeric plasticizers (elastomers), are opaque.

The PBA-g-PVC graft copolymers described in the prior art and prepared in emulsion or suspension processes can only be processed into translucent or opaque molded articles.

Cross-linked polyacrylic esters (PAE) may be employed to improve the notch impact strength of rigid PVC (EP 0472852). In DE 3803036, a suspension process is described which allows to obtain a PVC that contains 65 wt % of a cross-linked PAE. This product may be employed as an impact resistance modifier or as a polymeric plasticizer for PVC.

In EP 0647663, a method is described for producing thermoplastically elastomeric graft copolymerizates of PVC having cross-linked polyacrylates as a graft base.

In the prior art, the only method known to us for producing transparent polyacrylic ester-modified PVC articles using methods such as extrusion, injection molding or calendering, the usage of graft copolymers is described which contain a certain percentage of polystyrene within the polyacrylate phase. Due to its higher refractive index ($n_D^{20}$=1.60), the content of polystyrene counterbalances the difference in the refractive indices of poly(butyl acrylate) and PVC (Domininghaus-Kunststoffe, $7^{th}$ revised and extended edition 2008, chapter 2.1.2.2.1 Erhöhung der Schlagzähigkeit—Polyacrylate als Modifizierungsmittel für transparente PVC-Artikel, page 372). Due to the high glass transition temperature of polystyrene, this principle is only suitable for rigid PVC since the content of polystyrene outweighs the plasticizing effect of polyacrylates. Moreover, the UV and weathering resistance of PVC articles is impaired owing to the content of polystyrene.

Thus, it is the task of the invention to provide materials, based on vinyl chloride, without adding external plasticizers (in possibly various degrees of hardness Shore A 70 to Shore D 80), which may be processed into transparent films and molded articles.

An object of the present invention is a method for preparing a vinyl chloride graft copolymer by emulsion polymerization, in which the graft copolymer contains a graft base and a grafted copolymer phase, at least partially consisting of vinyl chloride, comprising the steps:

a) Preparing a graft base by polymerizing monomers, wherein by suitably selecting the monomers used the glass transition temperature $T_g$ of the graft base is adjusted, and b) Grafting a copolymer phase onto the graft base prepared in a) by emulsion polymerization, thus obtaining a vinyl chloride graft copolymer latex, wherein by suitably selecting the monomers used and the optionally used comonomers the glass transition temperature $T_g$ of the grafted copolymer phase is adjusted in such a way that the glass transition temperature $T_g$ of the graft base is lower than the glass transition temperature $T_g$ of the grafted copolymer phase, and c) Separating the vinyl chloride graft copolymer as a solid from the vinyl chloride graft copolymer latex, characterized in that the graft base prepared in Step a) is not being cross-linked. In a systematic study it has since been found that the cross-linking or non-cross-linking, respectively, of the graft base of the vinyl chloride graft copolymers has a great influence on the transparency of molded articles produced therefrom. By non-cross-linking the graft base, the transparency of a press plate produced from the respective vinyl chloride graft copolymer is highly improved. This also applies to vinyl chloride graft copolymers having a cross-linked or non-cross-linked graft shell. Thus, the grafted copolymer phase prepared in Step b) may be cross-linked or not cross-linked.

The glass transition temperature $T_g$ of the grafted copolymer phase typically lies in the range of above 20 to 120° C. and/or the one of the graft base in the range of −80 to 20° C. In a preferred embodiment of the invention, the glass transition temperature $T_g$ of the grafted copolymer phase lies between 40 and 90° C. and the one of the graft base between −60 and −20° C. The $T_g$'s of the grafted copolymer phase and of the graft base result from the composition of the respectively used monomers.

The percentage of the graft base is preferably 5 to 70 wt % and the percentage of the grafted copolymer phase is preferably 30 to 95 wt %, each based on the vinyl chloride graft copolymer.

The vinyl chloride graft copolymers are prepared in emulsion processes. In doing so, the graft base can be prepared by copolymerizing vinyl compounds. The grafted copolymer phase can be prepared from 60 to 100 wt %, preferably from 80 to 100 wt %, of vinyl chloride, and from 0 to 40 wt %, preferably from 0 to 20 wt %, of other polymerizable vinyl compounds.

The emulsion polymerization is preferably carried out semi-continuously. In the preparation process of the graft base, water, initiators, monomers, emulsifiers and other additives may be pre-charged into a reactor and partly added in small amounts. In a preferred embodiment, water and the total amount of emulsifier are pre-charged and both the monomers and the initiators are added. The feeding speed of the additives is based upon the conversion speed. The duration of the polymerization is adjusted to one to three hours by the amount of the initiator employed. After the polymerization has ended, the graft base is processed and pre-charged for the preparation of the graft copolymer. Vinyl chloride and, optionally, other polymerizable vinyl compounds are added within 10 min to 180 min. In a preferred embodiment, the amount of VC is divided into a portion to be pre-charged and a portion to be added. In the process, 5 to 20 parts of VC are pre-charged (at once), then polymerized until the pressure drops, and then the addition of the residual amount of VC is started. The temperature is regulated to adjust the desired K-value. In order to promote the polymerization, an initiator is added simultaneously. An emulsifier may be added to increase the stability of the dispersion. The content of solids in the fully polymerized dispersion lies between 20 and 60 wt %, and preferably between 30 and 55 wt %.

Suitable vinyl compounds for the graft base are, for example, acrylic acid esters or methacrylic acid esters (in brief: (meth)acrylic acid esters). Also, butadiene, 2-chlorobutadiene, 1-butene, isoprene, vinylidene chloride, vinyl acetate, vinyl alkyl ether, etc. can be used as vinyl compound.

For the grafting, preferably merely vinyl chloride is used. But it is also possible to homo- or copolymerize (meth) acrylic acid esters which contain 1 to 12 carbon atoms in the alkyl chain of the esterified linear, branched or cyclic alcohol, such as methyl acrylate, ethyl acrylate, propyl acrylate, butyl acrylate, t-butyl acrylate, pentyl acrylate, isopentyl acrylate, cyclohexyl acrylate, ethylhexyl acrylate, methyl methacrylate, ethyl methacrylate, propyl methacrylate, butyl methacrylate, t-butyl methacrylate, pentyl methacrylate, isopentyl methacrylate, ethylhexyl methacrylate, cyclohexyl methacrylate, etc.

In Step b) of the method according to the invention, the copolymer phase is typically grafted by emulsion polymerization using at least one emulsifier, wherein preferably 60 to 100 wt % of the emulsifier amount, based on the total amount of emulsifier, is pre-charged.

The polymerization temperature in the process of preparing each of the graft bases typically lies between 20 and 90° C., preferably between 60 and 85° C.

The polymerization temperature in the process of preparing each of the grafted copolymer phases typically lies between 45 and 90° C., preferably between 55 and 75° C.

Suitable ionic emulsifiers are alkyl sulfonates, aryl sulfonates, alkyl sulfates, alkyl ether sulfates, fatty acid salts, diaryl sulfonates, etc. It is also possible to use non-ionic emulsifiers, such as alkyl ether alcohols having 2 to 20 carbon atoms in the alkyl chain and 1 to 20 ethylene glycol units, fatty alcohols, etc., alone or in combination with ionic emulsifiers. The total amount of emulsifier lies between 0.1 to 5 wt %, based on the amount of monomers employed.

Suitable initiators are water-soluble peroxides, which form radicals by thermal decomposition alone or which can be caused to decompose in combination with a reducing agent and, if necessary, a catalyst. The amount of the initiators employed usually lies, according to experience, between 0.01 and 0.5 wt %, based on the monomers employed.

The grafted copolymer phase may be cross-linked or non-cross-linked. In the case of cross-linking, it is possible, in a preferred embodiment of the invention, to cross-link the grafted copolymer phase by copolymerization with one or more different monomers containing two or more ethylenically unsaturated double bonds that are not conjugated with each other.

Suitable compounds for cross-linking are diallyl phthalate, allyl methacrylate, allyl acrylate, ethylene glycol dimethacrylate, propylene glycol dimethacrylate, butylene glycol diacrylate, trimethylene glycol diacrylate, glycidyl methacrylate, glycidyl acrylate, etc.

In the method according to the invention, a vinyl chloride graft copolymer-containing latex is obtained by way of emulsion polymerization. The solid will subsequently be separated either by adding an electrolyte, coagulation and mechanical separation methods such as filtration, decantation or centrifugation of the latex, followed by drying, or by spray drying.

In a particular embodiment of the invention, at least two different vinyl chloride graft copolymers are prepared independently of each other according to the method described above and subsequently mixed, thus obtaining a blend, wherein the at least two different graft copolymers differ from each other by their respective percentage weight distribution of graft base and grafted copolymer phase, and wherein the blend only consists of graft copolymers prepared according to the method described above, mixed with each other.

In a preferred embodiment of the invention, the Steps a), b) and c) and the mixing are carried out in such a way that the blend contains:

A) one or more graft copolymers A, each containing 41 to 70 wt % of graft base and 30 to 59 wt % of grafted copolymer phase, and/or B) one or more graft copolymers B, each containing 26 to 40 wt % of graft base and 60 to 74 wt % of grafted copolymer phase, and/or C) one or more graft copolymers C, each containing 5 to 25 wt % of graft base and 75 to 95 wt % of grafted copolymer phase, wherein the blend contains at least two different graft copolymers which are covered by A) and B), by B) and C), by A) and C), or at least three different graft copolymers which are covered by A), B) and C).

Also an object of the invention is a vinyl chloride copolymer prepared by emulsion polymerization, containing a graft base and a grafted copolymer phase, at least partially consisting of vinyl chloride, wherein the glass transition temperature $T_g$ of the graft base is lower than the glass transition temperature $T_g$ of the grafted copolymer phase, characterized in that the graft base is not cross-linked. The vinyl chloride graft copolymer is preferably prepared according to the method described above. The above-described features of the vinyl chloride graft copolymers prepared according to the method of the invention preferably also apply to the invention's vinyl chloride graft copolymer per se.

Another object of the invention is a blend consisting of two or more different vinyl chloride graft copolymers prepared by emulsion polymerization, wherein the different graft copolymers each contain a graft base and a grafted copolymer phase, at least partially consisting of vinyl chloride, and wherein at least two of the different graft copolymers differ from each other by their percentage weight distribution of graft base and grafted copolymer phase, and wherein for each of the graft copolymers the glass transition temperature $T_g$ of the graft base is lower than the glass transition temperature $T_g$ of the grafted copolymer phase, characterized in that the graft bases of the graft copolymers are non-cross-linked. The blend, consisting of two or more different vinyl chloride graft copolymers, is preferably prepared according to the method described above.

Also an object of the invention is an article, manufactured by using a vinyl chloride graft copolymer prepared according to the method described above, or by using a blend containing different vinyl chloride graft copolymers prepared according to the method described above.

Preferred articles according to the invention have a transmittance of at least 65%, preferably of at least 75%, and particularly preferred of at least 85%, and/or a haze value of at most 60, preferably of at most 50, and particularly preferred of at most 40.

Also an object of the invention is the use of a vinyl chloride graft copolymer, as well as the use of the blends described above, for manufacturing an article, preferably for manufacturing films by way of extrusion and/or calendering, or for manufacturing molded articles by way of extrusion or injection molding.

In the following examples, the method according to the invention for preparing graft copolymers of vinyl chloride, having a high transmittance, will be described.

EXAMPLES

Example 1

Graft Base:

Into a 10-liter stirrer reactor with a water-cooled double jacket and equipped with a paddle agitator, 1166 g of deionized water, 68.6 g of butyl acrylate, 3088 g of a 1% solution of potassium myristate and 0.63 g of potassium peroxodisulfate were pre-charged and heated to 80° C. After the reaction had started, addition of 686 g of a 0.3% aqueous potassium peroxodisulfate solution within 180 min was started. Simultaneously, 1990 g of butyl acrylate were added within 180 min. After the addition had ended, the interior reactor temperature was maintained for 60 min and the preparation was cooled down subsequently. 6894 g of dispersion were discharged, having a solid content of 30 wt %, a surface tension of 51.6 mN/m and a pH of 7.6. The average volume-based particle size (PSV) was 12 nm.

Graft Copolymer:

Into a 10-liter autoclave with a water-cooled double jacket and a paddle agitator, 124 g of water, 1937 g of a 1% solution of potassium myristate, 3500 g of graft base and 1283 g of vinyl chloride were pre-charged and heated to 68° C. When the polymerization temperature was reached, addition of potassium peroxodisulfate and ascorbic acid was started. The adding speed was adjusted in such a way that the difference between the interior temperature and the supply temperature of the jacket cooling was about 10° C. After the pressure had dropped by 4 bar, the preparation was set to cool and depressurized. The dispersion was discharged. The solid content of the dispersion was 31.3 wt %, the surface tension was 56.6 mN/m, the pH was 8.3. The average volume-based particle size was 68 nm. The preparation was precipitated with calcium chloride and filtered by suction filtration. The residue was dried at 30° C. in a recirculating-air dryer to a residual moisture of <0.3% and finely ground with a centrifugal mill (Retsch ZM 200). The PBA content was determined to be 48.6 wt % by an oxygen analysis.

Example 2

Graft Base:

The graft base was prepared following Example 1. 6936 g of dispersion were discharged, having a solid content of 30 wt %, a surface tension of 49 mN/m and a pH of 7.5. The average volume-based particle size was 14 nm.

Graft Copolymer:

407 g of water, 2471 g of a 1% potassium myristate solution, 2330 g of graft base and 1633 g of vinyl chloride were pre-charged and polymerized following Example 1. The dispersion was discharged. The solid content of the dispersion was 30.1%, the surface tension was 57.8 mN/m, the pH was 8.8. The average volume-based particle size was 64 nm. The preparation was precipitated with calcium chloride and filtered by suction filtration. The residue was dried at 30° C. in a recirculating-air dryer to a residual moisture of <0.3% and finely ground with a centrifugal mill (Retsch ZM 200). The PBA content was determined to be 34.4 wt % by an oxygen analysis.

Example 3

Graft Base:

The graft base of Example 2 was used.

Graft Copolymer:

894 g of water, 2800 g of a 1% potassium myristate solution, 1167 g of graft base and 1983 g of vinyl chloride were pre-charged and polymerized following Example 1. The dispersion was discharged. The solid content of the dispersion was 29.7%, the surface tension was 59.1 mN/m, the pH was 9.0. The average volume-based particle size was 46 nm. The preparation was precipitated with calcium chloride and filtered by suction filtration. The residue was dried at 30° C. in a recirculating-air dryer to a residual moisture of <0.3% and finely ground with a centrifugal mill (Retsch ZM 200). The PBA content was determined to be 26.6 wt % by an oxygen analysis.

Example 4

Graft Base:

Into a 10-liter stirrer reactor with a water-cooled double jacket and equipped with a paddle agitator, 1791 of deionized water, 68.6 g of butyl acrylate, 0.63 g of potassium peroxodisulfate and 61.76 g of a 1% solution of potassium myristate were pre-charged and heated to 80° C. After the reaction had started, 1029 g of a 0.2% aqueous solution of potassium peroxodisulfate, 1990 g of butyl acrylate and 2059 g of a 1% potassium myristate solution were added within 180 min. After the addition had ended, the interior reactor temperature was maintained for 60 min and the preparation was cooled down subsequently. 6964 g of an aqueous dispersion having a solid content of 29.4 wt %, a surface tension of 50.1 mN/m and a pH of 8.1 were obtained. The average volume-based particle size was 227 nm.

Graft Copolymer:

Into a 10-liter autoclave with a water-cooled double jacket and a paddle agitator, 1863 g of water, 482 g of a 1% solution of potassium myristate and 3280 g of graft base were pre-charged and heated to 68° C. Subsequently, 120.6 g of vinyl chloride were added at once and further 1326 g of vinyl chloride were added within 100 min. For the activation, hydrogen peroxide and ascorbic acid solutions were used, the adding speed of which was regulated in such a way that the difference between the interior temperature and the supply temperature of the jacket cooling was about 10° C. After the pressure had dropped by 4 bar, the preparation was set to cool and depressurized. The dispersion was discharged. The solid content of the dispersion was 30.2 wt %, the surface tension was 53 mN/m, the pH was 7.3. The average volume-based particle size was 301 nm. The preparation was precipitated with calcium chloride and filtered by suction filtration. The residue was dried at 30° C. in a recirculating-air dryer to a residual moisture of <0.3% and finely ground with a centrifugal mill (Retsch ZM 200). The PBA content was determined to be 46.6 wt % by an oxygen analysis.

Example 5

Graft Base:

Into a 10-liter stirrer reactor, 3637 g of deionized water, 68.64 g of butyl acrylate, 617.6 g of potassium myristate (concentration: 5 wt %) and 0.63 g of potassium peroxodisulfate were pre-charged and heated to 80° C. After the reaction had started, addition of 686 g of a 0.3% aqueous solution of potassium peroxodisulfate within 180 min was started. Simultaneously, 1990 g of butyl acrylate were added within 180 min. After the addition had ended, the interior reactor temperature was maintained for 60 min and the preparation was cooled down subsequently. 6947 g of an aqueous dispersion having a solid content of 29.9 wt %, a surface tension of 50.3 mN/m and a pH of 7.5 were obtained. The average volume-based particle size was 23 nm.

Graft Copolymer:

1064 g of water, 332 g of a 5% potassium myristate solution, 3144 g of graft base, 1052 g of vinyl chloride and 8.0 g of diallyl phthalate were pre-charged and polymerized following Example 1. The solid content of the dispersion was 30.3 wt %, the surface tension was 55.6 mN/m, the pH was 7.6. The average volume-based particle size was 102 nm. The preparation was precipitated with calcium chloride and filtered by suction filtration. The residue was dried at 30° C. in a recirculating-air dryer to a residual moisture of <0.3% and finely ground with a centrifugal mill (Retsch ZM 200). The PBA content was determined to be 50 wt % by an oxygen analysis.

Example 6

Graft Base:

Into a 10-liter stirrer reactor, 1791 g of deionized water, 68.64 g of butyl acrylate, 61.76 g of potassium myristate (concentration: 1 wt %) and 0.63 g of potassium peroxodisulfate were pre-charged and heated to 80° C. After the reaction had started, addition of 1029 g of a 0.2% aqueous solution of potassium peroxodisulfate within 180 min was started. Simultaneously, 1990 g of butyl acrylate and 2059 g of a 1% aqueous solution of potassium myristate were added within 180 min. After the addition had ended, the interior reactor temperature was maintained for 60 min and the preparation was cooled down subsequently. 6824 g of an aqueous dispersion having a solid content of 29.5 wt %, a surface tension of 47.1 mN/m and a pH of 8.4 were obtained. The average volume-based particle size was 274 nm.

Graft Copolymer:

The preparation was prepared following Example 5. The solid content of the dispersion was 27.2 wt %, the surface tension was 42.1 mN/m, the pH was 8.5. The average volume-based particle size was 321 nm. The preparation was precipitated with calcium chloride and filtered by suction filtration. The residue was dried at 30° C. in a recirculating-air dryer to a residual moisture of <0.3% and finely ground with a centrifugal mill (Retsch ZM 200). The PBA content was determined to be 55.7 wt % by an oxygen analysis.

Experimental Procedures:

Measurement of Particle Sizes:

The particle size distributions were measured with a Microtrac Blue-Wave of the S 3500 series by Particle Metrix. The valid measuring range lies between 0.01 and 2000 μm. For the measurement, a standard procedure for dispersions was created, where certain physical properties of the dispersion were given. Before measurement, three drops of Hellmanex® by Hellma Analytics Co. were added to the deionized water inside the circulation unit, using a disposable 3 ml pipette. The cleanliness of the measurement system was validated by a baseline measurement. Dispersion was added carefully to the sample unit until a loading factor of about 0.004 was reached. Normally, 1 or 2 drops of dispersion are used. The measurement time was 30 s. Evaluation of the measurement is carried out automatically. The average volume-based particle size is used.

Two-Roll Rolling Mill (Including Processing Conditions and Recipe)

In order to determine mechanical values and optical properties, test samples have to be provided. The preparation of the rolled sheets is performed under the following conditions.

Recipe (Spatula Blend)

| | | |
|---|---|---|
| 100 | phr | Polymer |
| 1.5 | phr | BaZn stabilizer (Baerostab UBZ 171) |
| 3.0 | phr | Epoxydated soy bean oil (Edenol D 81) |
| 0.1 | phr | Isotridecyl stearate (Loxiol G 40) |
| 0.2 | phr | High-molecular weight multicomponent ester (Loxiol G 72) |
| 0.1 | phr | Calcium stearate (Ceasit SW) |

Rolling mill (made by Schwabenthan)
Roller material: chromed surfaces
Roller diameter: 150 mm
Speed ratio: 17/21 1/min
Roller temperature: 140° C.
Rolling time: 5 min Execution:

In order to form a cohesive mass (sheet), the powder compound is placed onto the roller. After formation of the sheet, the sheet is "cut" and "turned" for 3 min. Then set the thickness of the rolled sheet to 1.1 mm and continue to plasticize the sheet on the roller for further 2 min without cutting and turning. When the specified rolling time is over, the rolled sheet is taken off.

Press 30-ton laboratory press (Werner & Pfleiderer URH 30)
Press area: 350×350 mm
Pressing plates: chromed surfaces
Pressing frame: 220×220×1.0 mm Execution:

For making the press plates, the previously produced rolled sheets were cut corresponding to the frame size used, inserted into the frame and placed into the laboratory press together with the press plates that form the outer surfaces. The sheets are formed into a press plate under the conditions described below.

| Press temperature: 150° C. | |
|---|---|
| LP press power: 30 bar | LP pressing time: 2 min |
| HP press power: 200 bar | HP pressing time: 3 min |
| Removal temperature: 40° C. | |
| Cooling pressure: 200 bar | Cooling time: ca. 8 min |

Transmittance and Haze (Large-Angle Scattering)

In order to evaluate a film's transparency, two values were considered:
- the total transmittance (here: "transmittance"), which stands for the ratio of transmitted light to incident light and which depends on absorption properties and surface conditions
- large-angle scattering (haze), which is a measure for opaqueness.

Measurement:

Measurement of the transmittance and determination of the large-angle scattering of the semi-finished products produced with rollers/presses is carried out with the transparency meter Haze-Gard Dual by Byk-Gardner Inc.

The sample to be measured is illuminated perpendicularly and the transmitted light is photoelectrically measured in an integrating sphere. In this process, the perpendicularly transmitted light is measured in order to evaluate the transmittance, and the light that is scattered in an angle of 2° to the axis of irradiation is measured to evaluate the opaqueness (haze). The measurements are carried out according to ISO 13468, which guarantees that the measurement conditions are the same during calibration as well as during measurement.

TABLE 1

Overview: Test- and Comparative Examples and Press Plates Made Therefrom

| Patent Examples | PBA content (wt %) | Microtrac MV (nm) | Shore Hardness A | Shore Hardness D | Thickness of Press Plates (mm) | Transmittance, % | Haze | Remarks |
|---|---|---|---|---|---|---|---|---|
| Example 1 | 48.6 | 68 | 88 | 28 | 1.46 | 84.7 | 11.2 | Graft base and |
| Example 2 | 34.4 | 64 |  | 53 | 1.46 | 77.2 | 36.5 | graft shell non- |
| Example 3 | 26.6 | 46 |  | 64 | 1.63 | 72.2 | 26.8 | cross-linked |
| Example 4 | 46.6 | 301 |  | 39 | 1.35 | 83.3 | 7.65 |  |
| Example 5 | 50 | 102 | 84 | 29 | 1.60 | 85.3 | 11.7 | Graft base non- |
| Example 6 | 55.7 | 321 | 52 | 10 | 1.68 | 69.5 | 26.5 | cross-linked and graft shell cross-linked |
| Blend Example 1 | 41.5 |  |  | 41 | 1.56 | 78.4 | 24.4 | 0.50 Example 1 + 0.50 Example 2 |
| Vinnolit VK 710 | ca. 50 |  | 85 | 28 | 1.48 | 78.0 | 65.8 | Competitive product samples |
| Vinnolit K 707 E | ca. 50 |  | 79 | 25 | 1.81 | 53.9 | 68.8 |  |

The graft copolymers Vinnolit VK 710 and Vinnolit K 707 E, having a content of about 50 wt % of acrylate, represent the prior art. Particularly due to the high haze value (which characterizes the large-angle scattering), the press plates appear translucent to opaque. The examples according to the invention have a much better transparency, which in particular is characterized by a substantially lower light scattering. The test- and comparative examples give prove of the effect of the cross-linking of the graft base of the graft copolymers on the transparency of PVC articles manufactured therefrom.

The invention claimed is:

1. A vinyl chloride graft copolymer, comprising:
a graft base having a first glass transition temperature; and
a grafted copolymer phase having a second glass transition temperature and containing vinyl chloride,
wherein the first glass transition temperature is lower than the second glass transition temperature, the graft base is not cross-linked and the grafted copolymer phase is cross-linked, the graft base is in an amount from 5 wt. % to 25 wt. % by weight of the vinyl chloride graft copolymer, and the grafted copolymer phase is in an amount from 75 wt. % to 95 wt. % by weight of the vinyl chloride graft copolymer.

2. The vinyl chloride graft copolymer of claim 1, wherein the first glass transition temperature is from about −80° C. to about 20° C. and the second glass transition temperature is from about 20° C. to about 120° C.

3. The vinyl chloride graft copolymer of claim 1, wherein the grafted copolymer phase includes from about 60 wt. % to about 100 wt. % vinyl chloride by weight of the grafted copolymer phase and from about 0 wt. % to about 40 wt. % by weight of the grafted copolymer phase other vinyl compounds.

4. A vinyl chloride graft copolymer comprising:
a graft base prepared by polymerizing monomers, the graft base having a first glass transition temperature;
a copolymer phase grafted onto the graft base by emulsion polymerization to obtain a vinyl chloride graft copolymer latex, the grafted copolymer phase having a second glass transition temperature wherein the first glass transition temperature is lower than the second glass transition temperature, the vinyl chloride graft copolymer separated as a solid from the vinyl chloride graft copolymer latex, wherein the graft base is not cross-linked and the grafted copolymer phase is cross-linked, the graft base is in an amount from 5 wt. % to 25 wt. % by weight of the vinyl chloride graft copolymer, and the copolymer phase is in an amount from 75 wt. % to 95 wt. % by weight of the vinyl chloride graft copolymer.

5. The vinyl chloride graft copolymer of claim 4, wherein the first glass transition temperature is from about −80° C. to about 20° C.

6. The vinyl chloride graft copolymer of claim 5, wherein the second glass transition temperature is from about 20° C. to about 120° C.

7. The vinyl chloride graft copolymer of claim 4, wherein the grafted copolymer phase includes about 60 wt. % to about 100 wt. % vinyl chloride by weight of the grafted copolymer phase and from about 0 wt. % to about 40 wt. % by weight of the grafted copolymer phase other vinyl compounds.

8. The vinyl chloride graft copolymer of claim 4, wherein the vinyl chloride graft copolymer has a transmittance of at least 65% as measured according to ISO 13468 for a plate having a thickness from 1.35 mm to 1.68 mm.

9. A method of forming a vinyl chloride graft copolymer, the method comprising:

preparing a graft base by polymerizing monomers, the graft base having a first glass transition temperature;

grafting a copolymer phase onto the graft base by emulsion polymerization to obtain a vinyl chloride graft copolymer latex, the grafted copolymer phase having a second glass transition temperature wherein the first glass transition temperature is lower than the second glass transition temperature; and separating the vinyl chloride graft copolymer as a solid from the vinyl chloride graft copolymer latex, wherein the graft base is not cross-linked and the grafted copolymer phase is cross-linked, the graft base is in an amount from 5 wt. % to 25 wt. % by weight of the vinyl chloride graft copolymer, and the grafted copolymer is in an amount from 75 wt. % to 95 wt. % by weight of the vinyl chloride graft copolymer.

10. The method of claim 9, wherein the first glass transition temperature is from about −80° C. to about 20° C.

11. The method of claim 10, wherein the second glass transition temperature is from about 20° C. to about 120° C.

12. The method of claim 9, wherein the grafted copolymer phase includes about 60 wt. % to about 100 wt. % vinyl chloride by weight of the grafted copolymer phase and from about 0 wt. % to about 40 wt. % by weight of the grafted copolymer phase other vinyl compounds.

* * * * *